April 20, 1943.  P. KOLLSMAN  2,316,873
REMOTE INDICATING COMPASS
Filed Oct. 19, 1939   2 Sheets-Sheet 1

Inventor
Paul Kollsman
Gunter Rathke
By
his
Attorney

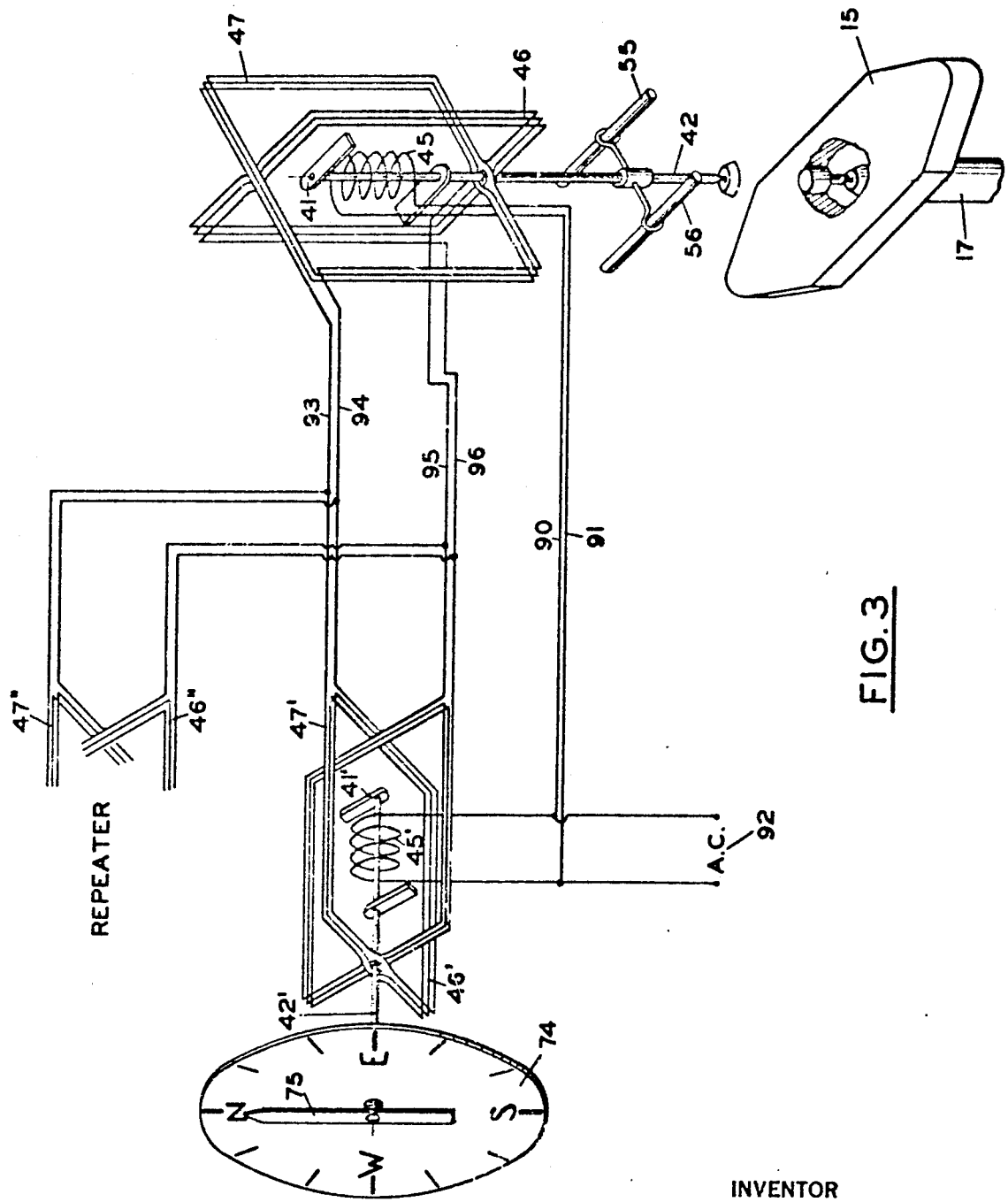

Patented Apr. 20, 1943

2,316,873

UNITED STATES PATENT OFFICE 2,316,873

REMOTE INDICATING COMPASS

Paul Kollsman, New York, N. Y., assignor, by mesne assignments, to Square D Company, Detroit, Mich., a corporation of Michigan Application October 19, 1939, Serial No. 300,115
In Great Britain November 5, 1938

6 Claims. (Cl. 33—222)

This invention relates to improvements in remote indicating compasses.

It is an object of this invention to provide an improved remote indicating compass device, more particularly adapted for use on aircraft, which will give a steady indication of direction under unfavorable conditions of operation, for example, while being acted upon by external movements or accelerations.

It is also an object of this invention to provide an improved remote indicating compass device in which the directional magnet constituting the principal element of the so-called "master compass" may be located at a point remote from the indicator or repeater and in which the latter automatically gives a steady and continuous operation over a range of 360° without the necessity of resetting of either master compass or remote indicator. The present invention thus aims at providing an improvement over the type of remote indicating compasses which are in the nature of a deviation-from-course indicator and which require setting of either the master compass or the repeater or both into the direction of flight.

It is a further object of this invention to accomplish the above outlined results without the aid of relays operated by the directional magnetic element and of servomotors controlled by such relays for operating the repeater or repeaters.

In carrying out the present invention, I purposely deviate from the opinion generally accepted in the art that in operating a remote transmission system a relay should be employed to prevent a load from being imposed on the directional magnet by the remote transmission system. In purposely providing for a load imposed on the directional magnet by the remote transmission system, I provide for a resilient coupling, preferably of the magnetic type, between the directional magnet and the repeater and thus obtain a very effective damping of both the directional magnet and the repeater by making use of the property of the remote transmission system to oscillate at a certain frequency if deflected from its normal position.

If, for example, in my remote reading compass device all of elements except the remote indicator are arrested in a certain position, the remote indicator deflected out of its correct position and subsequently released to return its correct position, it will be observed that, due to the resilient coupling between the elements, the remote indicator will return to its proper position in violent oscillations.

If the same experiment is repeated without arresting of the directional magnet in the master compass and the transmitter operated thereby, it will be observed that the oscillations of the remote indicator are almost entirely suppressed.

A similar effect is produced by the remote transmission system on the directional magnet when deviations from the north south position occur. This is due to the fact that in the improved compass device the directional magnet is not only magnetically confined to the direction of the earth's magnetic field but also to the remote transmission system. The directional magnet also has a natural period of oscillation in which it tends to return to its correct north south position after a deflection.

I have observed that the damping produced by the magnetically coupled movable elements upon each other in my remote reading compass is most effective when the natural period of oscillation of the movable element is made unequal. For example, it is desirable to make the period of oscillation of the remote transmission system unequal, preferably smaller, than the natural period of oscillation of the directional magnet. Very effective damping is obtained if the period of oscillation of the remote transmission system is made less than half of the period of oscillation of the directional magnet.

Thus by imposing a certain load on the directional magnet through a resilient coupling, preferably by using the energy required for operating the remote transmission system as such load, a most efficient damping of all the elements of the compass device is obtained.

It is a further object of this invention to render the remote reading compass device substantially unaffected by movements and acceleration forces such as occur on aircraft in distinction from slow disturbing movements on naval vessels. This is accomplished by using in the remote transmission system a transmitter and a repeater preferably of equal dimensions and by positioning the elements in such manner that the axis of rotation of one element, preferably the transmitter, is vertical while the axis of rotation of the armature of the other element is horizontal. This arrangement will result also in a damping of one element by the other. If, for example, a disturbing movement or acceleration occurs about the vertical axis, the element having a horizontal axis will remain unaffected and tend to oppose a deviation of the other element.

Further aims, objects and advantages of this invention will appear from a consideration of the description which follows the accompanying drawings showing for purely illustrative purposes an embodiment of this invention. It is to be understood, however, that the description is not to be taken in a limiting sense, the scope of the invention being defined in the appended claims.

Referring to the drawings:

Fig. 3 is a diagrammatic illustration of the principle of operation of this invention.

Figure 1:
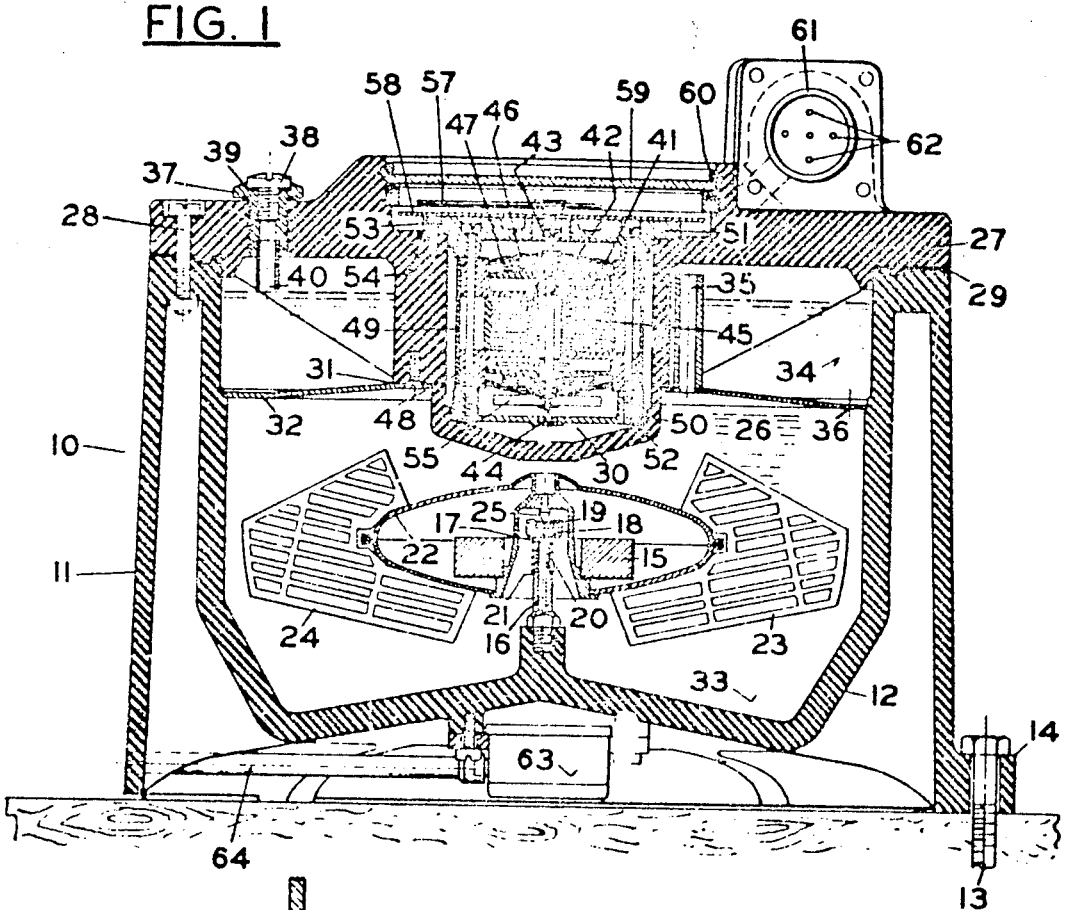
Fig. 1 shows in vertical cross-section a master compass according to this invention.

The master compass contains the directional magnet for operating the transmitter and may assume the form shown in Fig. 1. An instrument casing 10 is shown as forming an outer portion 11 and an inner portion 12 forming a compass bowl. The compass casing may be fixedly mounted on board of craft such as by means of screws 13 passing through mounting lugs 14 and is preferably made of a non-metallic material such as a molded resinous composition known under the trade name of "Bakelite" for the purpose of avoiding eddy currents from being set up which would impair the free movement of the directional magnet.

In the compass bowl 12 a directional magnet 15 is universally mounted for free movement to permit the magnet to turn about and tilt relatively to a substantially vertical axis.

In the illustrated embodiment a hollow post 16 is secured to the bottom of the bowl serving as a guide for a stem 17 slidable therein. The stem 17 flares out at its upper end into a cup-shaped portion 18 in which a jewel 19 is mounted. A spring 20 rests against the cup-shaped portion 18 and a shoulder 21 on the post thus resiliently supporting the stem and jewel.

The directional magnet 15 is mounted inside a hollow vessel 22 forming a float preferably provided with damping fins 23, 24. The float rests in the jewel 19 on a point 25.

The compass bowl is filled with a liquid 26 the specific gravity of which and the displacement and weight of the float being so proportioned that the pressure exerted by the point 25 on the jewel 19 is extremely small, thereby reducing the friction to a minimum.

The directional magnet 15 with the float 22 and the damping fins 23, 24 thus forms a movable system having freedom to adjust itself in azimuth and also freedom to tilt relatively to the vertical axis. For the purpose of maintaining the directional magnet in a substantially horizontal position the point 25 is located slightly above the center of gravity of the movable system in the float, thus resulting in a pendulous support of the movable system.

The instrument casing 10 is closed by means of a cover 27 secured thereto in any suitable manner such as by means of screws 28 holding the cover tightly against a packing ring or gasket 29. The cover is shaped to form a central compartment 30 for an electric transmitter. In the illustrated embodiment the walls of the compartment are provided with a shoulder 31 to which a partition 32 is secured separating the compass bowl into a lower chamber 33 and an upper or expansion chamber 34.

The expansion chamber is provided to permit expansion and contraction of the compass fluid in response to changes in temperature and for the further purpose of permitting air or gas bubbles to escape from the lower chamber. For this purpose a vent conduit 35 is connected to the uppermost part of the partition 32 permitting air or gas to escape from the lower chamber 33 communicating with a liquid in the upper chamber 34 through an opening 36 in the partition.

Liquid may be filled and a correct liquid level maintained in the compass bowl by means of a filler plug 37. In the illustrated embodiment the filler plug includes a closure screw 38 bearing against a gasket 39 and is provided with a level maintaining tube 40 at its lower end. This tube permits the compass bowl to be filled up to a level which is determined by the length of the tube.

If thus in filling the compass bowl with liquid the level reaches the lower end of the tube 40 no further liquid can be filled into the bowl and a predetermined air space is automatically provided above the liquid. This air space is large enough to permit the liquid to expand and contract without building up undue pressure within the bowl.

For remotely transmitting the direction of the magnetic element 15 relatively to the casing 10, a transmitter is mounted in the compartment 30 coaxially with the directional magnet.

The transmitter is preferably of the form shown and described in the co-pending application of Paul Kollsman, entitled Remote indicator, Serial No. 189,816 filed February 10, 1938 (Patent No. 2,239,790, dated April 29, 1941). The transmitter consists of a Z-shaped armature 41 having a shaft 42 mounted in bearings 43 and 44. A polarizing winding 45 is provided coaxial with the shaft of the armature for alternately polarizing the armature upon connection to a source of alternating current. Field windings 46 and 47 surround the armature and are arranged at right angles to each other and to the polarizing winding 45.

In the illustrated embodiment the polarizing winding 45 may be characterized as having a vertical axis which would be the axis upon which the coil is rotated during the process of winding. Similarly, field winding 46 may be characterized as having a horizontal axis lying in the plane of the drawings while the field winding 47 has a horizontal axis normal to the plane of the drawings.

Depending upon the relative position of the Z-shaped armature with respect to the field windings, an alternating E. M. F. will be induced in one or both of the field windings by the armature, the relative magnitude of the E. M. F. in the two windings being a measure for the relative position of the armature with respect to the field windings. The windings are carried by a body 48 also preferably of molded resinous material. The body is mounted within a housing including a sleeve 49 and end-bells 50 and 51.

In the illustrated embodiment the lower end-bell 50 is fitted against a seat 52 in the compartment 30 while the upper end-bell 51 rests with a flange 53 against the shoulder 54 in the cover.

For the purpose of causing the transmitter to follow the movements of the directional magnet and to align its armature with the magnetic north south direction, a magnetic follower element is connected to the shaft of the transmitter. In the illustrated embodiment the follower element consists of two parallel and horizontal magnets 55 and 56 only one of which is visible in Fig. 1 at 55. The follower magnets are preferably aligned with the vanes or ends of the Z-shaped armature.

The relative size of the follower element with respect to the directional element is such that one of the elements, preferably the directional element, is longer and has narrower pole faces or pole areas than the other element. This is accomplished in the illustrated embodiment for example by making the directional magnet 15 longer than either of the follower magnets 55 and 56 by giving the directional magnet tapering pole faces as will appear from Fig. 3, thus providing for a relatively narrow pole face or area.

The directional element, on the other hand, consisting of two magnets shorter than the directional magnet is provided with a wider pole face than the directional magnet, this being accomplished by spacing the magnets 55 and 56 in a horizontal plane. The pole area or pole face of the follower element is thus represented by the space between the two north poles at the one end of the follower element and the two south poles at the other end.

The purpose of forming the directional and the follower element in this manner is to compensate for errors which normally would be caused by an inclination of the directional magnet with respect to the vertical axis generally called "inclination error." The nature and compensation of this error is described in greater detail in the co-pending application of Paul Kollsman, entitled Directional instruments, Serial No. 217,904, filed July 7, 1938 (Patent No. 2,206,506, dated July 2, 1940).

Due to its construction, more particularly the absence of brushes or slip rings, the friction of the movable parts of the transmitter is extremely small.

As the transmitter continuously follows the position of the directional magnet it may also be provided with indicating means. In the illustrated embodiment a pointer 57 is secured to the end of the shaft 42 movable over a dial 58, pointer and dial being visible through a window 59 held in place by a snap ring 60.

For connecting the transmitter of the master compass to a source of alternating current and to repeaters, a terminal post 61 is shown secured to the cover 27 of the instrument casing and containing prongs 52 permitting a cable connection to be made with the master compass by means of a plug. The electrical connections will be explained and described in greater detail in connection with Fig. 3.

The master compass may further be provided with a magnetic compensator of conventional form. In the illustrated embodiment a compensator 63 is shown arranged coaxially with the directional magnet containing compensating magnets, the position of which is adjustable by means of shafts 64 adjustable from the outside of the instrument casing 10.

Figure 2:
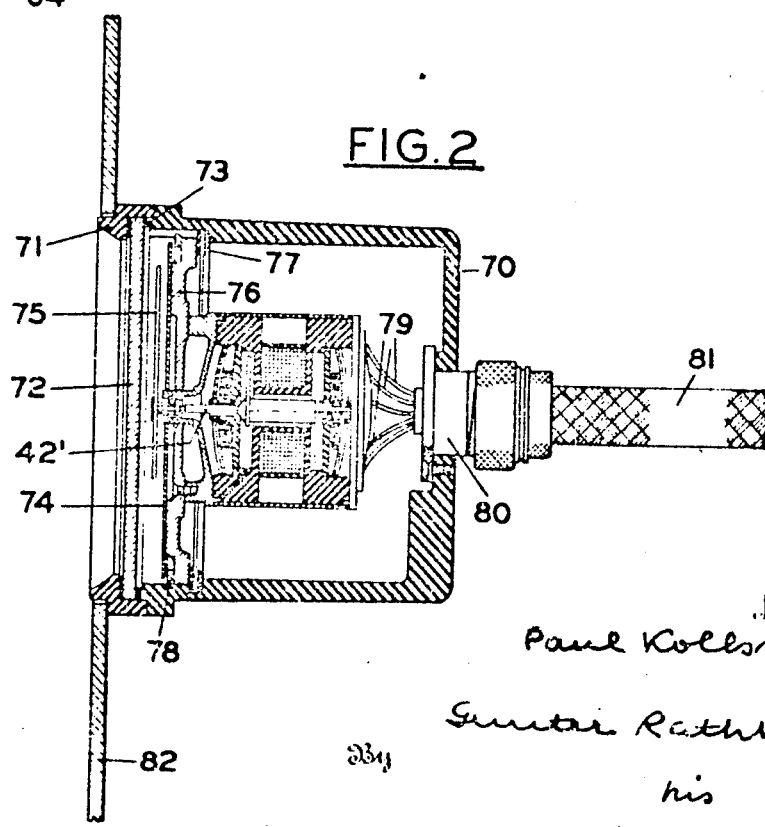
Fig. 2 shows in vertical cross-section a repeater compass according to this invention.

A repeater compass is shown in Fig. 2 which generally consists of a repeater motor and indicating means. In the illustrated form the compass repeater contains an instrument case 70 having a removable front flange 71 holding a window 72 against a gasket 73. Through the window there is visible a dial 74 bearing directional graduations and a pointer 75 movable relatively to the dial. The pointer is carried by a shaft 42' of a repeater motor and, in the illustrated embodiment, is identical in all elements with the transmitter of the master compass except that its armature is not provided with a follower magnet. By reason of the similarity of all the other elements of the repeater motor, a detailed description can be dispensed with.

The repeater motor is mounted to a flange 76 bearing against a large spring washer 77 and held in place by a snap ring 78. Leads 79 are connected to a plug 80 in the rear of the instrument case and provided with prongs (not shown) similar to the terminal connections 62 of the master compass permitting a cable 81 to be connected thereto. The remote indicator is shown in the drawings as mounted to a substantially vertical instrument panel 82 thus causing the shaft of the repeater motor to assume a horizontal position.

The principle of operation of the invention is illustrated in Fig. 3. The master compass is represented by the directional magnet 15 and the essential elements of the transmitter are illustrated, such as the follower magnets 55 and 56 carried on the shaft 42 of the armature. The polarizing winding 45 is shown connected by means of leads 90 and 91 to a source of alternating current 92, preferably of a frequency in the order of 400 cycles per second. The Z-shaped armature 41 connected to the shaft 42 is movable relatively to the field windings 46 and 47 which are connected through leads 93 and 94 to field windings 47' and 47'' of repeaters. The field winding 46 of the transmitter is connected through leads 95 and 96 to repeater windings 46' and 46''.

If thus the polarizing windings are connected to a source of alternating current, an E. M. F. is induced in the two field windings of the transmitter and the corresponding field windings of the repeaters causing the repeater armatures to assume positions corresponding to that of the armature of the transmitter. In this manner a steady and continuous transmission over 360° of the position of the directional magnet and the master compass is accomplished.

In deviating from the practice generally accepted in the art, I purposely provide for a certain load imposed on the directional magnet by way of a resilient coupling.

It is apparent that the remote transmission system consisting of transmitter and repeater or repeaters constitutes a load on the directional magnet.

A pointer 75 of a repeater is thus not directly connected to the directional magnet 15 but through a resilient magnetic coupling, for example, magnetic couplings exist between the armature 41' of the repeater and the field windings 46' and 47''. A similar magnetic coupling exists in the transmitter between the armature 41 and its field windings. I have found that such connection of an indicator to the directional element will result in a very steady indication especially if the natural period of oscillation between the movable systems is made unequal. This becomes apparent from the following consideration.

If, for example, the armature of the transmitter is arrested and the pointer of the repeater 75 deflected which may be due to an external disturbing influence and if then the pointer is permitted to return to its proper position it will so return in violent oscillations, the period of oscillation being a characteristic of the electrical system determined by the strength of the magnetic coupling and the mass of movable parts.

If the same experiment is repeated while the armature of the transmitter is not arrested, it is found that a disturbing influence of equal strength will result in a much smaller deflection of the indicator and also result in a very effective damping of the indicator.

In this manner the indicator is dampened by the transmitter and vice versa.

A further improvement is obtained when the axes of rotation of the armatures are arranged in non-parallel position, the preferred position being that in which the armature of the transmitter is vertical while the armature of the repeater is horizontal. In this arrangement disturbing acceleration forces acting on the remote transmission device will only affect one of the armatures while the other armature serves to dampen and suppress the deflection of the first.

The directional magnet 15 may also be regarded as a member capable of oscillation if deflected out of its correct north south position, the directional magnet will return into its proper position in oscillations. In the arrangement according to this invention, however, the directional magnet is not only resiliently coupled to the earth's magnetic field, but also to the remote transmission system. This results in a very efficient damping of the directional magnet if the period of oscillation of the directional magnet and the period of oscillation of the remote transmission system is made unequal. A preferred relation is one in which the period of oscillation of the remote transmission system is half or less than half of that of the directional magnet.

The improvement may easily be ascertained by an experiment. If, for example, the directional magnet 15 entirely separated from and not under the influence of the remote transmission system is deflected out of its proper north south position, it will return to its correct position in oscillations and come to rest only after considerable time.

If the same experiment is repeated with the directional magnet under influence of the load of the remote transmission system, it is found that a disturbing force will have considerably less influence on the directional magnet and also that the directional magnet is dampened in almost dead-beat manner.

Experiments further have shown that if a directional magnet is used which adjusts itself to the direction of the earth's magnetic field with an accuracy of one-half degree, in combination with a remote transmission system according to the present invention, the accuracy of indication at the remote indicator is the same as the accuracy of the directional magnet, that is one-half degree.

In this manner a very simple, but efficient remote reading compass is obtained which operates without relays and power amplifiers and gives a steady accurate indication due to a novel means of damping by means of a combination of two systems capable of oscillating at unequal frequencies.

Obviously the present invention is not restricted to the present embodiments herein shown and described. Moreover, it is not indispensable that all the features of this invention be used conjointly since they may advantageously be employed in various combinations and subcombinations.

What is claimed is:

1. A remote reading compass device comprising, in combination, a directional magnet; a remote indicator; and an A. C. remote transmission system of the self-synchronous type including an A. C. repeater connected to said indicator, and an A. C. transmitter electrically connected to said repeater, said transmitter being coupled with said directional magnet to be driven by the unamplified torque of the transmitter causing the transmitter to exert a reaction on said directional magnet, said remote transmission system having a period of oscillation different from the period of oscillation of said directional magnet, whereby the transmission system tends to dampen oscillations of the magnet and vice versa.

2. A remote reading compass device comprising, in combination, a directional magnet mounted for 360° movement in azimuth; a remote indicator having a range of indication of 360°; and an A. C. remote transmission system of the self-synchronous type including a transmitter motor and a repeater motor, each motor having a wound stator connected to the stator of the other motor, and a rotatable armature having no electrical connections, said repeater armature being connected to said indicator, said transmitter armature being coupled with the directional magnet to be driven by the unamplified torque of the transmitter causing the transmitter to exert a reaction on said directional magnet, said remote transmission system having a period of oscillation shorter than the period of oscillation of said directional magnet, whereby the transmission system tends to dampen oscillations of the directional magnet and vice versa.

3. A remote reading compass device comprising, in combination, a directional magnet mounted for 360° movement in azimuth; a remote indicator having a range of indication of 360° and a substantially vertical dial; and an A. C. remote transmission system of the self-synchronous type including an A. C. repeater having a substantially horizontal shaft operating said indicator, and an A. C. transmitter electrically connected to said repeater, said transmitter having a substantially vertical shaft coupled with said directional magnet to be driven by the unamplified torque of the transmitter causing the transmitter to exert a reaction on said directional magnet, said remote transmission system having a period of oscillation shorter than the period of oscillation of said directional magnet, whereby the transmission system tends to dampen oscillations of the magnet and vice versa.

4. A remote reading compass device comprising, in combination, a directional magnet; a remote indicator; and an A. C. transmission system of the self-synchronous type including an A. C. repeater having an armature connected to said indicator, and an A. C. transmitter having an armature coupled with said directional magnet to be driven by the unamplified torque of the directional magnet, both repeater and transmitter having electrically interconnected field windings thus establishing a resilient magnetic transmission between magnet and indicator, the transmission system having a period of oscillation shorter than the period of oscillation of said directional magnet, whereby the transmission system tends to dampen oscillations of the magnet and vice versa.

5. A remote reading compass comprising, in combination, a directional magnet mounted for freedom to turn about, and tilt relatively to, a substantially vertical axis; a magnetic follower element mounted for rotation co-axially with said magnetic element; a remote indicator; and an electric transmission system including a transmitter having an armature of magnetic material connected to said follower element to be driven by the unamplified torque of the follower element which exerts a reaction on the follower element, means for alternately polarizing said armature, and field windings adapted to be induced by said armature, said system further including a repeater having an armature of magnetic material connected to said indicator, means for alternately polarizing said armature, and field windings connected to the field windings of the transmitter and electromagnetically acting on the repeater armature, said transmission system having a period of oscillation shorter than the period of oscillation of the directional magnet, whereby the transmission system tends to dampen oscillations of the magnetic element and vice versa.

6. A remote reading compass comprising, in combination, a directional magnet mounted for freedom to turn about, and tilt relatively to, a substantially vertical axis; a magnetic follower element mounted for rotation co-axially with said magnetic element; a remote indicator movable about a substantially horizontal axis; and an electric transmission system including a transmitter having an armature of magnetic material, connected to said follower element to rotate co-axially therewith driven by the unamplified torque of the follower element which exerts a reaction on the follower element, means for alternately polarizing said armature, and field windings adapted to be induced by said armature, said system further including a repeater having an armature of magnetic material connected to said indicator to rotate co-axially therewith, means for alternately polarizing said armature, and field windings connected to the field windings of the transmitter and electromagnetically acting on the repeater armature, said transmission system having a period of oscillation shorter than the period of oscillation of the directional magnet, whereby the compass indication will remain steady even under accelerations acting on the compass about a horizontal or a vertical axis, said transmission system tending to dampen oscillations of the magnetic element and vice versa.

PAUL KOLLSMAN.